(12) United States Patent
Lin et al.

(10) Patent No.: US 7,741,569 B2
(45) Date of Patent: Jun. 22, 2010

(54) ELECTRONIC WEIGHT SCALE

(75) Inventors: Chyun-Chau Lin, Tainan (TW); Nien-Te Liu, Tainan (TW); Shu-Hung Yeh, Hunei Township (TW); Chieh-I Wang, Minsyong Township (TW)

(73) Assignee: Shu-Te University, Yen Chau, Kaohsiung County (TW)

( * ) Notice: Subject to any disclaimer, the term of this patent is extended or adjusted under 35 U.S.C. 154(b) by 202 days.

(21) Appl. No.: 12/175,838

(22) Filed: Jul. 18, 2008

(65) Prior Publication Data

US 2009/0229889 A1    Sep. 17, 2009

(30) Foreign Application Priority Data

Mar. 17, 2008    (TW) .............................. 97109319 A

(51) Int. Cl.
*G01G 21/28*    (2006.01)
(52) U.S. Cl. ..................................... 177/126
(58) Field of Classification Search ................. 177/126, 177/127, 199, 200
See application file for complete search history.

(56) References Cited

U.S. PATENT DOCUMENTS

| D274,991 | S | * | 8/1984 | Wirtz | D10/92 |
| 4,711,313 | A | * | 12/1987 | Iida et al. | 177/127 |
| 5,393,935 | A | * | 2/1995 | Hasty et al. | 177/45 |
| 5,414,225 | A | * | 5/1995 | Garfinkle | 177/199 |
| 6,337,446 | B1 | * | 1/2002 | Hulburt et al. | 177/126 |
| 7,022,920 | B2 | * | 4/2006 | Hulburt et al. | 177/126 |
| 7,521,638 | B1 | * | 4/2009 | Godshaw et al. | 177/126 |
| 7,683,272 | B2 | * | 3/2010 | Hong | 177/126 |
| 2002/0129978 | A1 | * | 9/2002 | Montagnino et al. | 177/126 |
| 2006/0131082 | A1 | * | 6/2006 | Shai | 177/126 |
| 2009/0173550 | A1 | * | 7/2009 | Gerster | 177/126 |
| 2009/0294184 | A1 | * | 12/2009 | Gerster et al. | 177/126 |

FOREIGN PATENT DOCUMENTS

DE    003140483 A1 *    4/1983    ................. 177/126

* cited by examiner

*Primary Examiner*—Randy W Gibson
(74) *Attorney, Agent, or Firm*—Occhiuti Rohlicek & Tsao LLP

(57) ABSTRACT

An electronic weight scale includes: a main scale module including a main weight sensor disposed in a main housing and outputting an output corresponding to weight acting on the main housing and sensed thereby, a controller operable in one of folded and unfolded modes in response to a control signal from an input unit, and a display unit mounted on the main housing; and an auxiliary scale unit connected pivotally to the main scale module and including an auxiliary scale module that has an auxiliary weight sensor disposed in an auxiliary housing and outputting an output corresponding to weight acting on the auxiliary housing and sensed thereby. The controller outputs weight information, that indicates the output from the main weight sensor when in the folded mode and that indicates a sum of the outputs from the main and auxiliary weight sensors when in the unfolded mode, to the display unit.

6 Claims, 7 Drawing Sheets

US 7,741,569 B2

ELECTRONIC WEIGHT SCALE

CROSS-REFERENCE TO RELATED APPLICATION

This application claims priority of Taiwanese Application No. 097109319, filed on Mar. 17, 2008.

BACKGROUND OF THE INVENTION

1. Field of the Invention

The invention relates to a weight scale, more particularly to an electronic weight scale.

2. Description of the Related Art

Referring to FIG. 1, a conventional electronic weight scale 1 is shown to include: a housing 11 having a supporting surface; a weight sensor 12 disposed in the housing 11 for sensing weight that acts on the supporting surface of the housing 11 and for outputting an output corresponding to the weight sensed thereby; a control circuit 14 disposed in the housing 11, coupled to the weight sensor 12, and outputting weight information that indicates the output from the weight sensor 12; and a display unit 13 coupled to the control circuit 14 for displaying the weight information from the control circuit 14 thereon.

In use, a user to be weighted usually stands on the supporting surface of the housing 11. However, the conventional electronic weight scale 1 is not suitable for a user who cannot stand properly, for example, a baby, a sick person, or a physically handicapped person.

SUMMARY OF THE INVENTION

Therefore, an object of the present invention is to provide an electronic weight scale that can overcome the aforesaid drawbacks of the prior art.

According to the present invention, an electronic weight scale comprises:

a main scale module including
   a main housing having a supporting surface,
   a main weight sensor disposed in the main housing for sensing weight that acts on the supporting surface of the main housing and for outputting an output corresponding to the weight sensed thereby,
   an input unit mounted on the main housing and operable so as to output a control signal,
   a controller disposed in the main housing, coupled to the main weight sensor and the input unit, and receiving the output from the main weight sensor and the control signal from the input unit, and
   a display unit mounted on the main housing and coupled to the controller; and
an auxiliary scale unit connected pivotally to the main scale module and including at least one auxiliary scale module that includes
   an auxiliary housing having a supporting surface, and
   an auxiliary weight sensor disposed in the auxiliary housing, coupled to the controller of the main scale module, sensing weight that acts on the supporting surface of the auxiliary housing, and outputting an output corresponding to the weight sensed thereby to the controller of the main scale module.

The controller is operable, in response to the control signal from the input unit, in one of a folded mode, where the main scale module is stacked on the auxiliary scale unit and where the controller outputs weight information that indicates the output from the main weight sensor to the display unit, and an unfolded mode, where the main scale module and the auxiliary scale unit are unfolded and where the controller outputs weight information that indicates a sum of the output from the main weight sensor and the output from the auxiliary weight sensor of the at least one auxiliary scale module of the auxiliary scale unit to the display unit, such that the weight information is displayed on the display unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
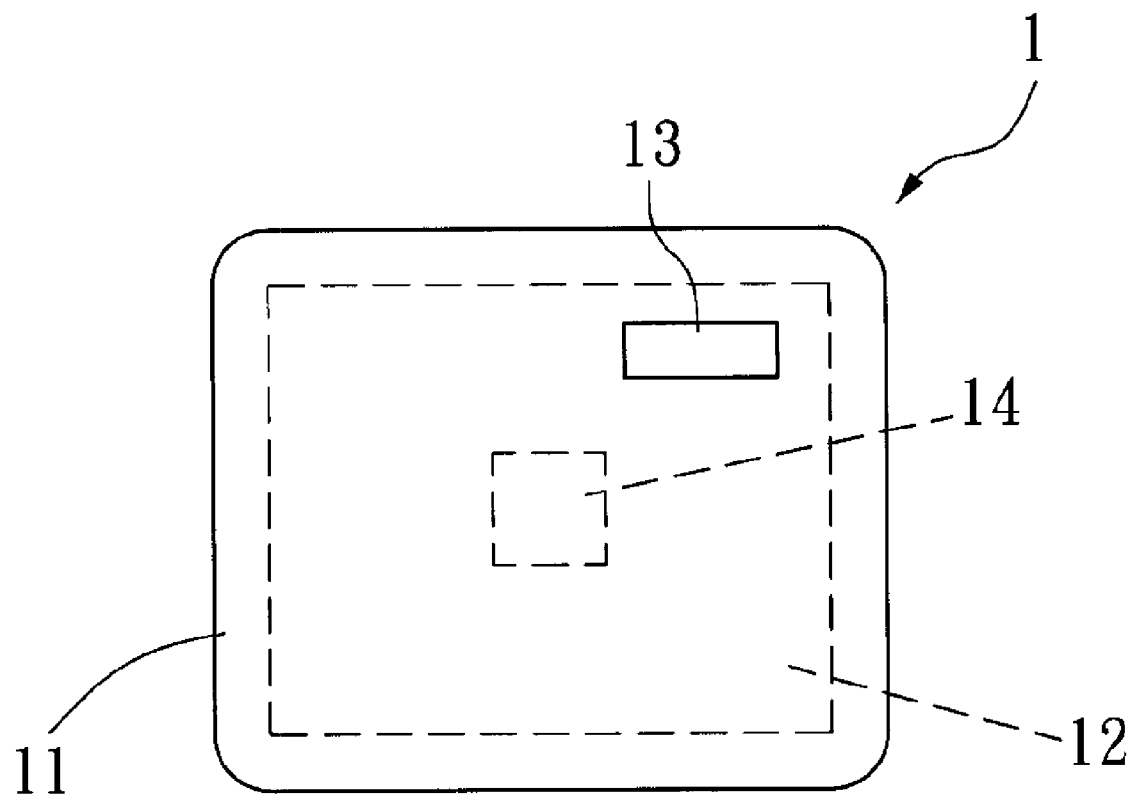
FIG. 1 is a schematic view of a conventional electronic weight scale.

Before the present invention is described in greater detail, it should be noted that like elements are denoted by the same reference numerals throughout the disclosure.

Figure 2:
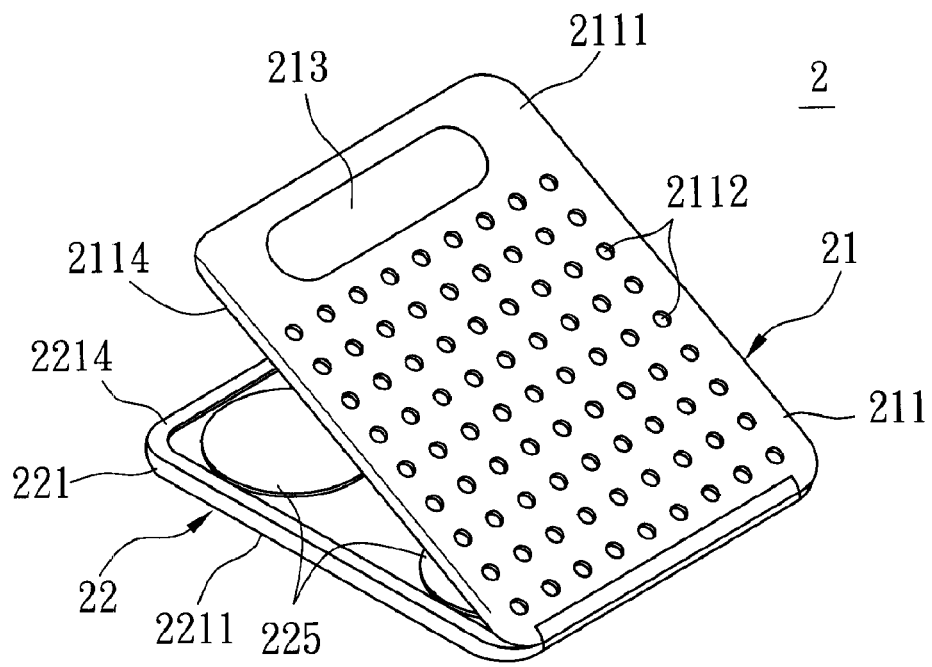
FIG. 2 is a perspective view showing the first preferred embodiment of an electronic weight scale according to the present invention.
Figure 3:
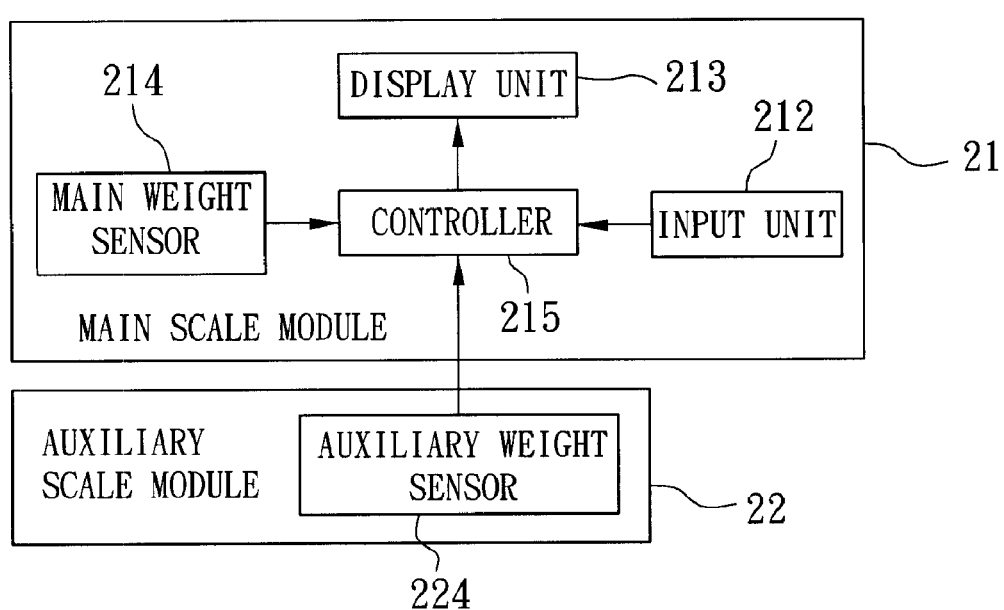
FIG. 3 is a schematic circuit block diagram illustrating the first preferred embodiment.

Referring to FIGS. 2 and 3, the first preferred embodiment of an electronic weight scale 2 according to the present invention is shown to include a main scale module 21, and an auxiliary scale unit connected pivotally to the main scale module 21.

The main scale module 21 includes a main housing 211, a main weight sensor 214, an input unit 212, a controller 215, and a display unit 213. The main housing 211 has a supporting surface 2111. The main weight sensor 214 is disposed in the main housing 211 for sensing weight that acts on the supporting surface 2111 of the main housing 211 and for outputting an output corresponding to the weight sensed thereby. The input unit 212 is mounted on the main housing 211, and is operable so as to output a control signal. The controller 215 is disposed in the main housing 211, is coupled to the main weight sensor 214 and the input unit 212, and receives the output from the main weight sensor 214 and the control signal from the input unit 212. The display unit 213 is mounted on the supporting surface 2111 of the main housing 211, and is coupled to the controller 215. In this embodiment, the supporting surface 2111 of the main housing 211 is an anti-slip surface, wherein the supporting surface 2111 is formed with a plurality of recesses 2112. Furthermore, the main housing 211 has a side surface 2114 opposite to the supporting surface 2111 and provided with an anti-slip pad unit (not shown) including a plurality of anti-slip pads.

In this embodiment, the auxiliary scale unit includes a single auxiliary scale module 22. The auxiliary scale module 22 includes an auxiliary housing 221 and an auxiliary weight sensor 224. The auxiliary housing 221 is connected pivotally to the main housing 211, and has a size identical to that of the main housing 211 of the main scale module 21, and a supporting surface 2211. The auxiliary weight sensor 224 is disposed in the auxiliary housing 221, is coupled to the controller 215 of the main scale module 21, senses weight that acts on the supporting surface 2211 of the auxiliary housing 221, and outputs an output corresponding to the weight sensed thereby to the controller 215 of the main scale module 21. Similar to the main housing 211, the supporting surface 2211 of the auxiliary housing 221 is an anti-slip surface, wherein the supporting surface 2211 is formed with a plurality of recesses 2212 (see FIG. 5). Furthermore, the auxiliary housing 221 has a side surface 2214 opposite to the supporting surface 2211 and provided with an anti-slip pad unit including a plurality of anti-slip pads 225, as shown in FIG. 2.

Figure 4:
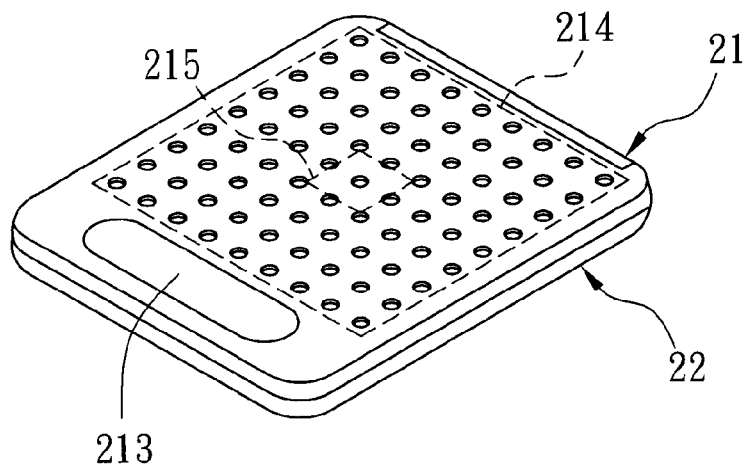
FIG. 4 is a perspective view showing the first preferred embodiment in a state of use.
Figure 5:
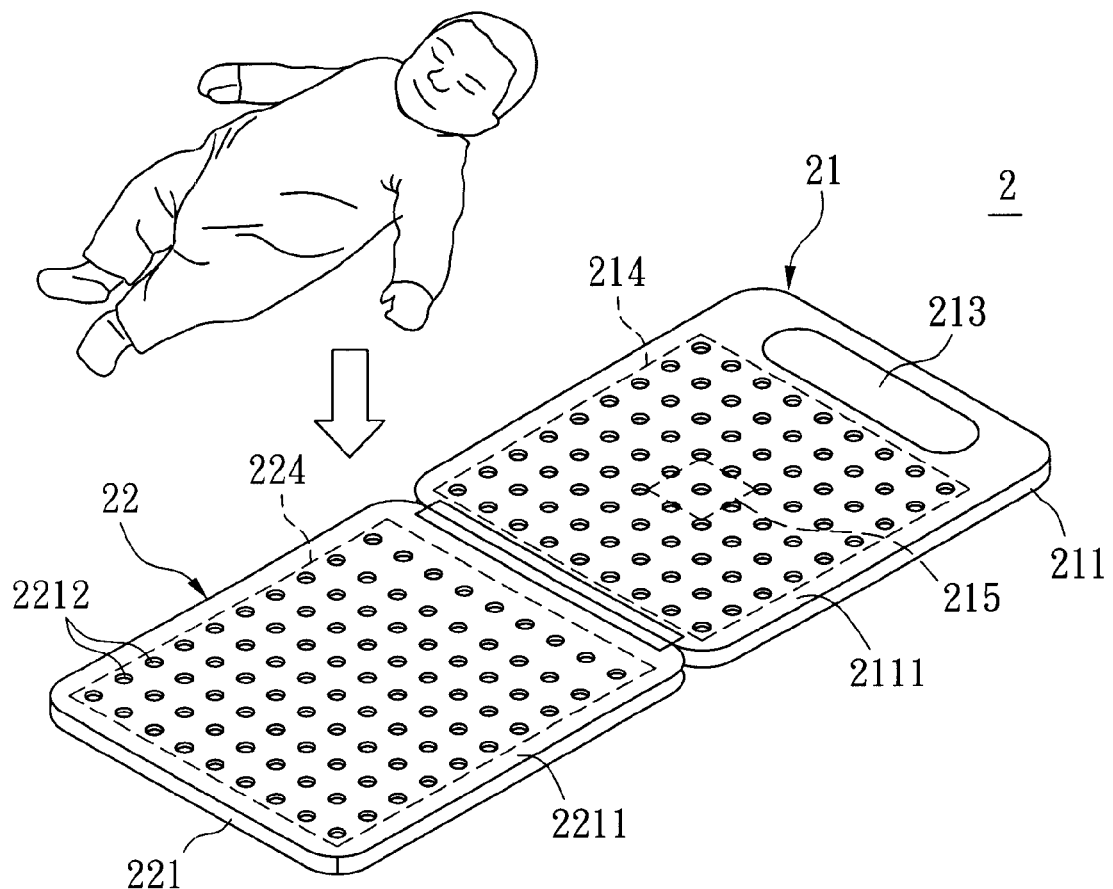
FIG. 5 is a perspective view showing the first preferred embodiment in another state of use.

The controller 215 is operable, in response to the control signal from the input unit 212, in one of a folded mode, where the main scale module 21 is stacked on the auxiliary scale module 22 of the auxiliary scale unit, as shown in FIG. 4, and where the controller 215 outputs weight information that indicates the output from the main weight sensor 214 to the display unit 213, and an unfolded mode, where the main scale module 21 and the auxiliary scale module 22 of the auxiliary scale unit are unfolded, as shown in FIG. 5, and where the controller 215 outputs weight information that indicates a sum of the output from the main weight sensor 214 and the output from the auxiliary weight sensor 224 of the auxiliary scale module 22 of the auxiliary scale unit to the display unit 213, such that the weight information is displayed on the display unit 213.

Thus, the electronic weight scale 2 of this invention is suitable for weighting a baby when the controller 215 is operated in the unfolded mode.

Figure 6:
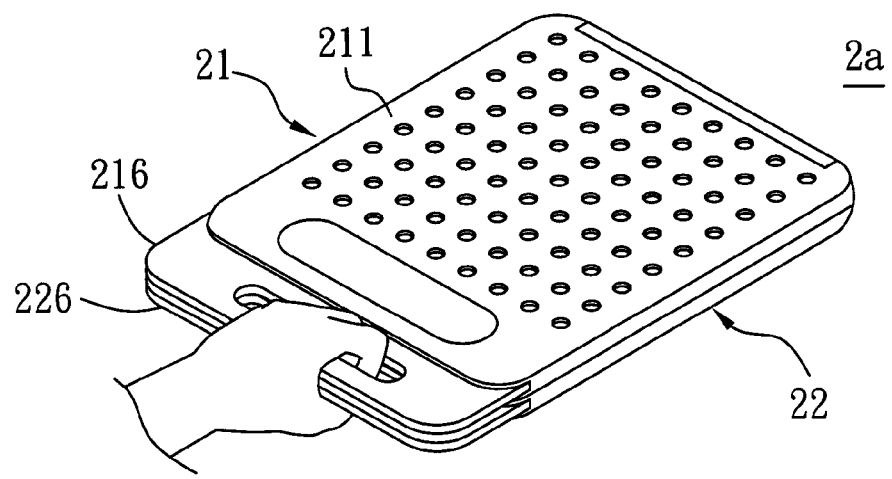
FIG. 6 is a perspective view showing the second preferred embodiment of an electronic weight scale according to the present invention.

FIG. 6 illustrates the second preferred embodiment of an electronic weight scale (2a) according to this invention, which is a modification of the first preferred embodiment. In this embodiment, the main housing 211 of the main scale module 21 further has a main grip 216, and the auxiliary scale module 22 of the auxiliary scale unit further has an auxiliary grip 226 that is aligned with the main grip 216 when the main scale module 21 and the auxiliary scale module 22 of the auxiliary scale unit are folded together.

Figure 7:
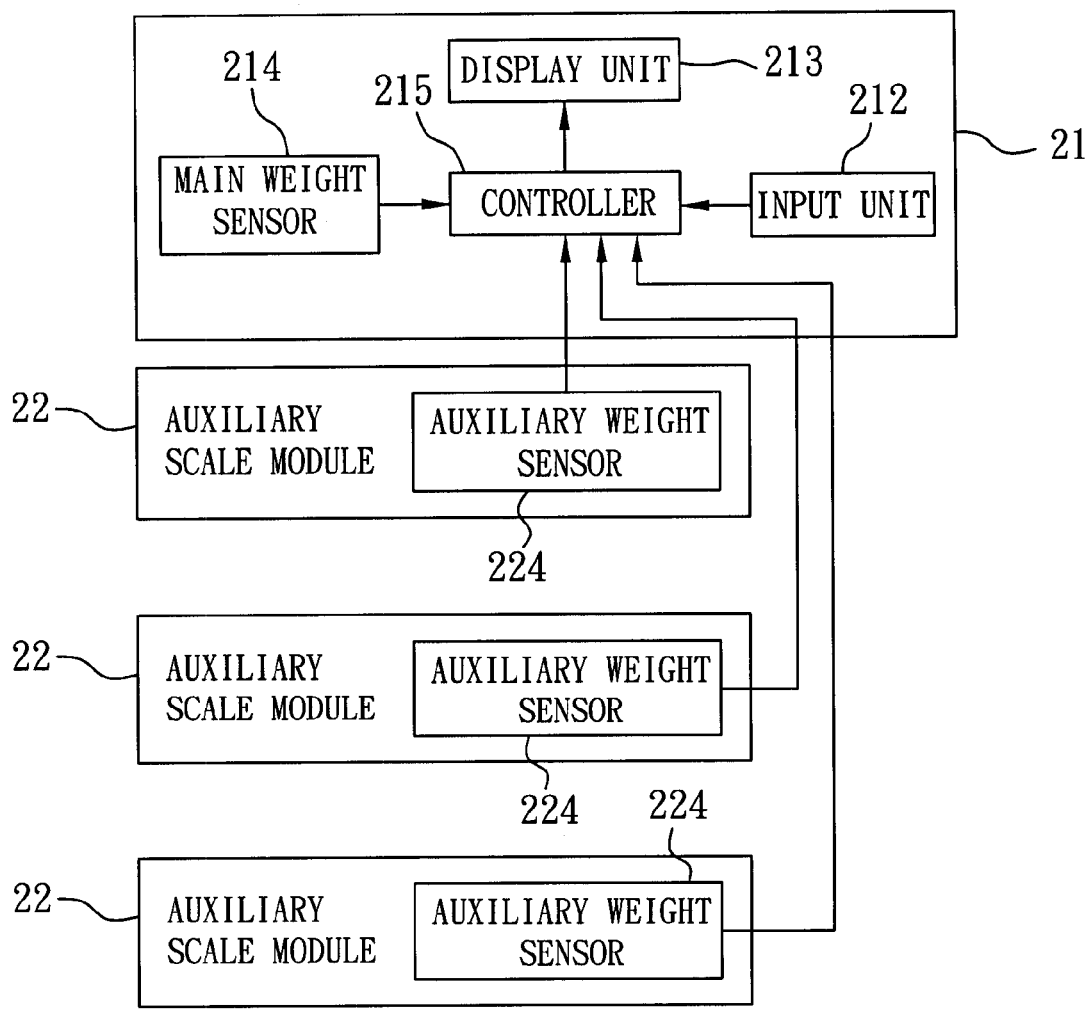
FIG. 7 is a schematic circuit block diagram illustrating the third preferred embodiment of an electronic weight scale according to the present invention.
Figure 8:
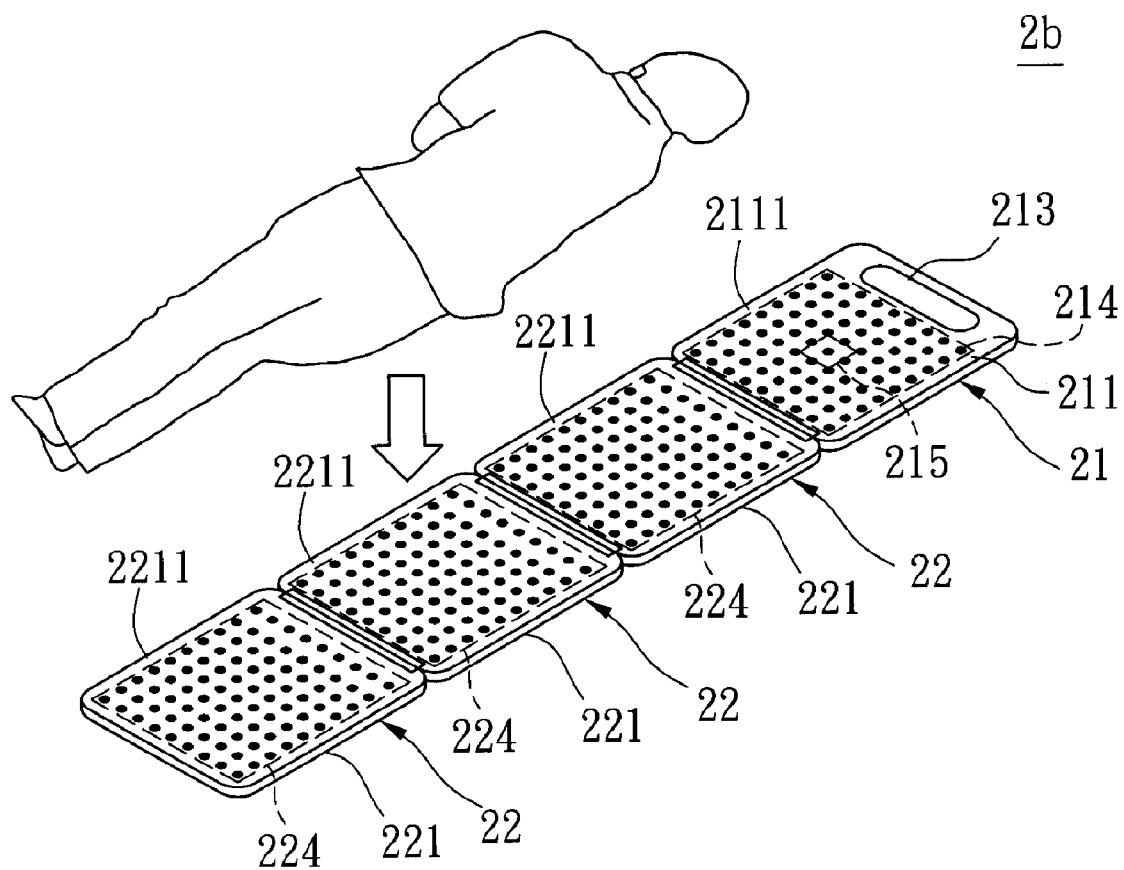
FIG. 8 is a perspective view showing the third preferred embodiment in a state of use.

FIGS. 7 and 8 illustrate the third preferred embodiment of an electronic weight scale (2b) according to this invention, which is a modification of the first preferred embodiment. In this embodiment, the auxiliary scale unit includes three of the auxiliary scale modules 22 connected pivotally in series. One of the auxiliary scale modules 22 is connected pivotally to the main scale module 21. The auxiliary weight sensor 224 of each auxiliary scale module 22 is coupled to the controller 215 of the main scale module 21. The auxiliary scale modules 22 of the auxiliary scale unit are stacked one on top of the other, and the main scale module 21 is stacked on the auxiliary scale unit when the controller 215 is operated in the folded mode. On the other hand, the auxiliary scale modules 22 of the auxiliary scale unit and the main scale module 21 are fully unfolded, and the controller 215 outputs the weight information that indicates the sum of the output from the main weight sensor 214 and the outputs from the auxiliary weight sensors 224 of the auxiliary scale modules 22 of the auxiliary scale unit when the controller 215 is operated in the unfolded mode.

Figure 9:
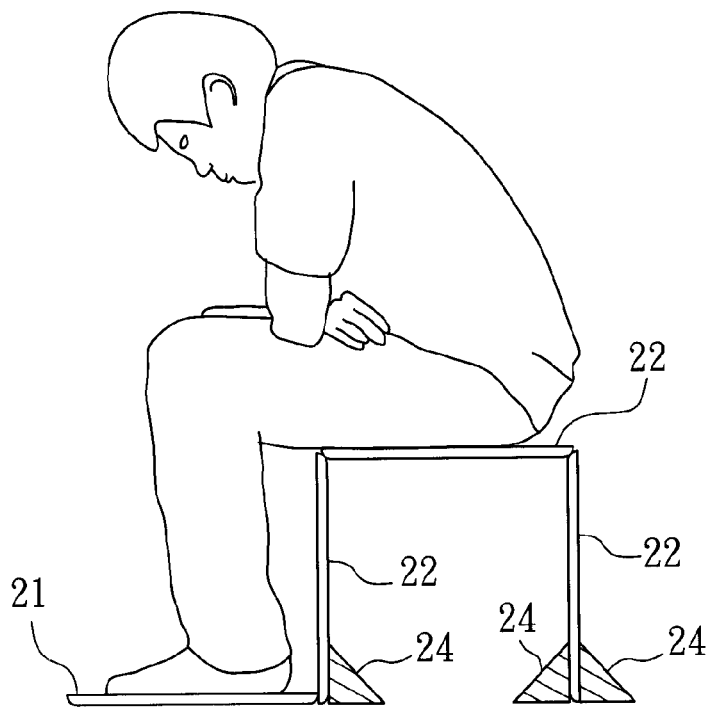
FIGS. 9 and 10 are schematic views showing the third preferred embodiment in another state of use.
Figure 10:
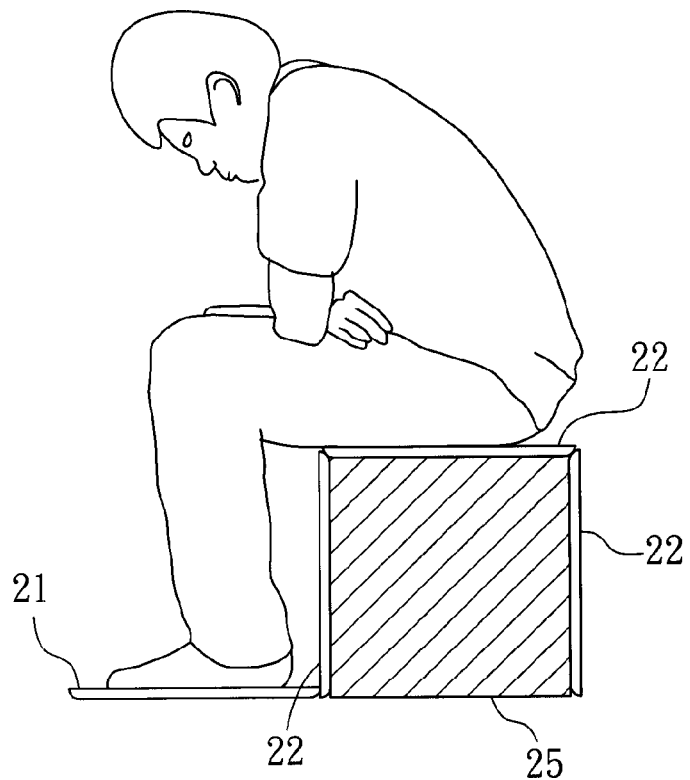

Thus, the electronic weight scale (2b) of this invention is suitable for weighting a person who cannot stand when the controller 215 is operated in the unfolded mode, as shown in FIG. 8, wherein the main scale module 21 and the auxiliary scale modules 22 of the auxiliary scale unit are placed on a plane such that the person to be weighted can lie on the supporting surfaces 2111, 2211 of the main and auxiliary housings 211, 221. On the other hand, when the controller 215 is operated in the unfolded mode, as shown in FIGS. 9 and 10, the main scale module 21 and the auxiliary scale modules 22 of the auxiliary scale unit are unfolded so that the electronic weight scale (2b) can serve as a chair for supporting a user to be weighted, wherein supporting blocks 241 shown in FIG. 9 and a supporting block 25 shown in FIG. 10 are required.

Figure 11:
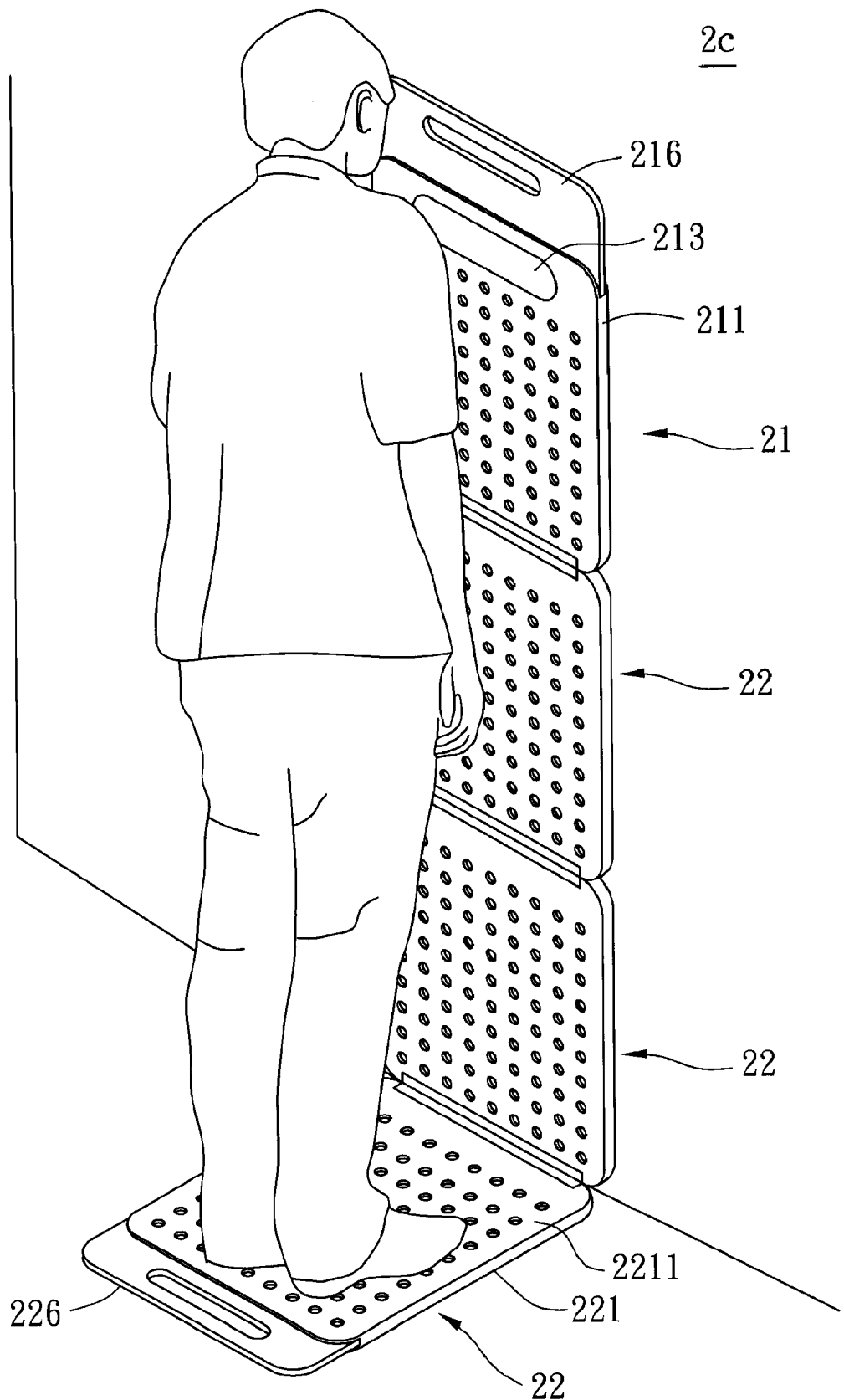
FIG. 11 is a perspective view showing the fourth preferred embodiment of an electronic weight scale according to the present invention.

FIG. 11 illustrates the fourth preferred embodiment of an electronic weight scale (2c) according to this invention, which is a modification of the third preferred embodiment. In this embodiment, the main housing 211 of the main scale module 21 further has a main grip 216. The auxiliary housing 221 of one of the auxiliary scale modules 22 opposite to the main scale module 21 has an auxiliary grip 226 that is aligned with main grip 216 when the main scale module 21 and the auxiliary scale modules 22 of the auxiliary scale unit are fully folded. It is noted that, when the controller (not shown) is operated in the unfolded mode, the electronic weight scale (2c) is placed so that a series connection of the main scale module 21 and two of the auxiliary scale modules 22 is perpendicular to the remaining auxiliary scale module 22 and that the main scale module 21 is disposed above the remaining auxiliary scale module 22. As a result, when a user to be weighted stands on the supporting surface 2211 of the remaining auxiliary scale module 22, the user can easily read the weight information displayed on the display unit 213.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An electronic weight scale comprising:
   a main scale module including
      a main housing having a supporting surface,
      a main weight sensor disposed in said main housing for sensing weight that acts on said supporting surface of said main housing and for outputting an output corresponding to the weight sensed thereby,
      an input unit mounted on said main housing and operable so as to output a control signal,
      a controller disposed in said main housing, coupled to said main weight sensor and said input unit, and receiving the output from said main weight sensor and the control signal from said input unit, and
      a display unit mounted on said main housing and coupled to said controller; and
   an auxiliary scale unit connected pivotally to said main scale module and including at least one auxiliary scale module that includes
      an auxiliary housing having a supporting surface, and
      an auxiliary weight sensor disposed in said auxiliary housing, coupled to said controller of said main scale module, sensing weight that acts on said supporting surface of said auxiliary housing, and outputting an output corresponding to the weight sensed thereby to said controller of said main scale module;

wherein said controller is operable, in response to the control signal from said input unit, in one of a folded mode, where said main scale module is stacked on said auxiliary scale unit and where said controller outputs weight information that indicates the output from said main weight sensor to said display unit, and an unfolded mode, where said main scale module and said auxiliary scale unit are unfolded and where said controller outputs weight information that indicates a sum of the output from said main weight sensor and the output from said auxiliary weight sensor of said at least one auxiliary scale module of said auxiliary scale unit to said display unit, such that the weight information is displayed on said display unit.

2. The electronic weight scale as claimed in claim 1, wherein said main housing of said main scale module further has a main grip, and said auxiliary scale unit has an auxiliary grip that is aligned with said main grip when said main scale module and said auxiliary scale unit are folded together.

3. The electronic weight scale as claimed in claim 1, wherein:

said auxiliary scale unit includes a plurality of said auxiliary scale modules connected pivotally in series, one of said auxiliary scale modules being connected pivotally to said main scale module, said auxiliary weight sensor of each of said auxiliary scale modules being coupled to said controller of said main scale module;

said auxiliary scale modules of said auxiliary scale unit are stacked one on top of the other, and said main scale module is stacked on said auxiliary scale unit when said controller is operated in the folded mode; and said auxiliary scale modules of said auxiliary scale unit and said main scale module are fully unfolded, and said controller outputs the weight information that indicates the sum of the output from said main weight sensor and the outputs from said auxiliary weight sensors of said auxiliary scale modules of said auxiliary scale unit when said controller is operated in the unfolded mode.

4. The electronic weight scale as claimed in claim 3, wherein said main housing of said main scale module further has a main grip, said auxiliary housing of one of said auxiliary scale modules opposite to said main scale module having an auxiliary grip that is aligned with said main grip when said main scale module and said auxiliary scale modules of said auxiliary scale unit are fully folded.

5. The electronic weight scale as claimed in claim 1, wherein said supporting surface of each of said main housing and said auxiliary housing is an anti-slip surface.

6. The electronic weight scale as claimed in claim 1, wherein each of said main housing and said auxiliary housing has a side surface opposite to said supporting surface thereof and provided with an anti-slip pad unit thereon.

* * * * *